(12) United States Patent
Yu et al.

(10) Patent No.: US 7,078,007 B2
(45) Date of Patent: Jul. 18, 2006

(54) METHOD FOR MANUFACTURING CARBON NANOTUBES

(75) Inventors: Se-gi Yu, Kyungki-do (KR); Whi-kun Yi, Kyungki-do (KR); Jeong-hee Lee, Kyungki-do (KR); Yong-wan Jin, Seoul (KR); Tae-won Jeong, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 526 days.

(21) Appl. No.: 10/353,936

(22) Filed: Jan. 30, 2003

(65) Prior Publication Data

US 2003/0141179 A1 Jul. 31, 2003

(30) Foreign Application Priority Data

Jan. 30, 2002 (KR) ................. 2002-5367

(51) Int. Cl.
*D01F 9/12* (2006.01)
(52) U.S. Cl. .............. 423/447.1; 428/402; 977/742
(58) Field of Classification Search ............ 423/447.1, 423/460, 461; 977/DIG. 1, 734–753; 428/402
See application file for complete search history.

(56) References Cited

U.S. PATENT DOCUMENTS 5,698,175 A * 12/1997 Hiura et al. ............. 423/447.1
6,517,800 B1 * 2/2003 Cheng et al. ............ 423/447.1
6,846,345 B1 * 1/2005 Keller et al. ................ 75/255

FOREIGN PATENT DOCUMENTS

KR  A-2001-0051909  6/2000
WO  01/12886 A1  2/2001

OTHER PUBLICATIONS

European Search Report issued by the European Patent Office on Dec. 17, 2004 in corresponding application.
Anne C. Dillon, et al., "A Simple and Complete Purification of Single-Walled Carbon Nanotube Materials," Advanced Materials, vol. 11, No. 16, Nov. 10, 1999, pp. 1354-1358.
M. Monthioux et al., "Sensitivity of Single-Wall Carbon Nanotubes to Chemical Processing: An Electron Microscopy Investigation," Carbon, vol. 39, No. 8, Jul. 2001, pp. 1251-1272.
A. C. Dillion, et al., "Evaluating the Purity of Single-Wall Nanotube Materials," Mater. Res. Soc. Symposium Proceedings, vol. 633, 2001 Materials Research Society, pp. A5.2.1-A5.2.6.

* cited by examiner

*Primary Examiner*—Colleen P. Cooke
*Assistant Examiner*—Rebecca M. Stadler
(74) *Attorney, Agent, or Firm*—Buchanan Ingersoll PC

(57) ABSTRACT

A carbon nanotube manufacturing method is provided. In the carbon nanotube manufacturing method, carbon nanoparticles are dispersed in a strong acid solution and heated at a predetermined temperature under reflux to form carbon nanotubes from the carbon nanoparticles. The carbon nanotubes can be simply produced on a mass-scale at low costs by using the strong acid solution.

6 Claims, 4 Drawing Sheets

METHOD FOR MANUFACTURING CARBON NANOTUBES

CROSS-REFERENCE TO RELATED APPLICATIONS

This application is based upon and claims priority from Korean Patent Application No. 2002-5367 filed Jan. 30, 2002, the contents of which are incorporated herein by reference.

BACKGROUND OF THE INVENTION

1. Field of the Invention

The present invention relates to a method for manufacturing carbon nanotubes, and more particularly, to a method for manufacturing carbon nanotubes by binding carbon nanoparticles manufactured by a conventional method.

2. Description of the Related Art

Conventionally, carbon nanotubes have been manufactured by a physical method, such as arc discharging or laser vaporization, or by a chemical method such as chemical vapor deposition (CVD).

FIG. 1 shows an arc discharging apparatus applied to the conventional arc discharging method. Initially, graphite rods are mounted as a cathode 11 and an anode 13, and a voltage is applied across the two electrodes to occur discharging between the two electrodes. As a result, carbon particles falling away from the anode graphite rod are attached to the cathode graphite node whose temperature is maintained to a low level, by attraction.

FIG. 2 shows a laser vaporization apparatus applied to the conventional laser vaporization method. Initially, the temperature of a reactor 27 is maintained at about 1200, and a graphite 23 placed in the reactor 17 is irradiated by a laser beam 21 to vaporize the graphite 23. The graphite vapor is adsorbed onto a collector 25 maintained at a low temperature.

In the conventional physical methods for manufacturing carbon nanotubes, such as arc discharging or laser vaporization, a pure anode graphite rod having a cavity filled with metal powder, such as Co, Ni, Fe, or Y, is used to obtain single-walled or multiple-walled carbon nanotubes. However, forming the graphite node containing a predetermined amount of a particular catalytic metal complicates the overall carbon nanotube manufacturing process, and thus the physical methods cannot be applied to produce carbon nanotubes on an industrial scale. In addition, single-walled carbon nanotubes produced by the physical methods contain a great amount of impurities, such as amorphous carbon or metal particles, and thus needs an additional purification process.

FIG. 3 shows an apparatus applied to a conventional plasma enhanced chemical vapor deposition (PECVD) method. According to the PECVD method, a reactive gas is discharged in a vacuum chamber by a direct current or high-frequency electric field applied across two electrodes. Referring to FIG. 3, a substrate 31 on which carbon nanotubes are to be grown is placed on a grounded lower electrode 32, and a reactive gas is supplied between an upper electrode 34 and the lower electrode 32. A thermal resistive heater 33 is mounted underneath the lower electrode 32, or a filament 35 is disposed between the upper electrode 34 and the lower electrode 32, to decompose the reactive gas. The energy needed to decompose the reactive gas and to synthesize the carbon nantotubes is supplied from a high-frequency power source 37. As the reactive gas, $CH_4$, $C_2H_2$, $H_2$, etc. are used.

Compared with the physical methods described above, the conventional CVD method is favorable for mass production and advantageously does not need an additional purification process. However, similar to the conventional physical method, it is not easy to inject and control a catalyst. In addition, the conventional CVD method needs a high-temperature growing process and thus increases the complexity of the process, energy consumption, and costs.

SUMMARY OF THE INVENTION

Accordingly, it is an object of the present invention to provide an economical, large-scale method for manufacturing carbon nanotubes containing few impurities.

To achieve the object of the present invention, there is provided a method for manufacturing carbon nanotubes, comprising: dispersing carbon nanoparticles in a strong acid solution; and heating the strong acid solution at a predetermined temperature under reflux to form carbon nanotubes from the carbon nanoparticles.

In the method, preferably, the carbon nanoparticles are formed by laser vaporization or arc discharging. Preferably, the strong acid solution is one selected from the group consisting of a nitric acid solution, a sulfuric acid solution, and a phosphoric acid solution, and has a concentration of about 30%.

It is preferable that the carbon nanoparticles are dispersed in a nitric acid solution in a concentration of about 1%. It is preferable that the predetermined temperature at which the strong acid solution is heated is about 110–140° C.

According to the present invention, the carbon nanotubes can be easily manufactured on a large scale through a reaction with a strong acid solution while being refluxed.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Embodiments of a carbon nanotube manufacturing method according to the present invention will be described in greater detail with reference to the appended drawings.

Figure 1:
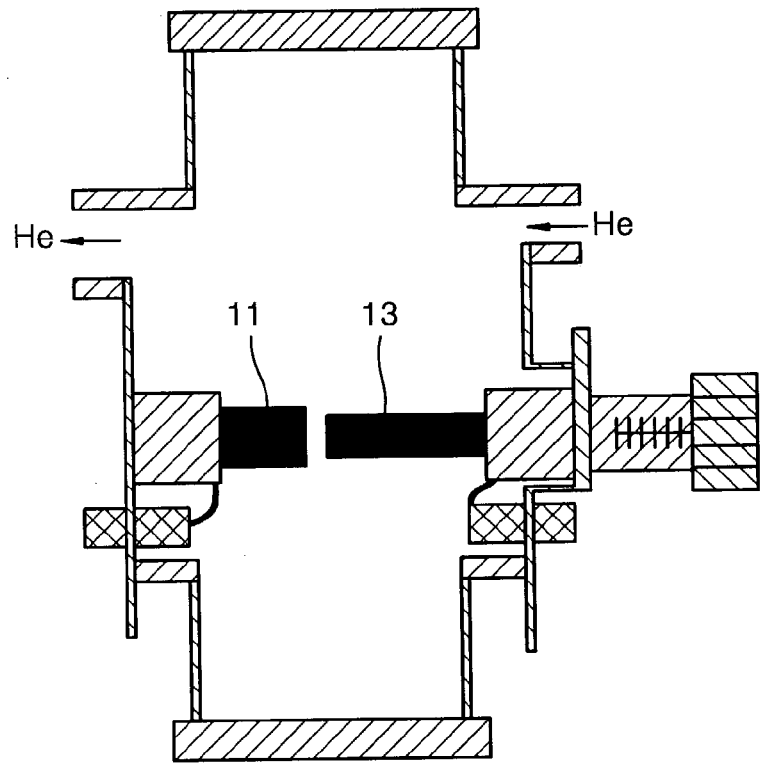
FIG. 1 shows an arc discharging apparatus applied to a conventional arc discharging method for manufacturing carbon nanotubes.
Figure 2:
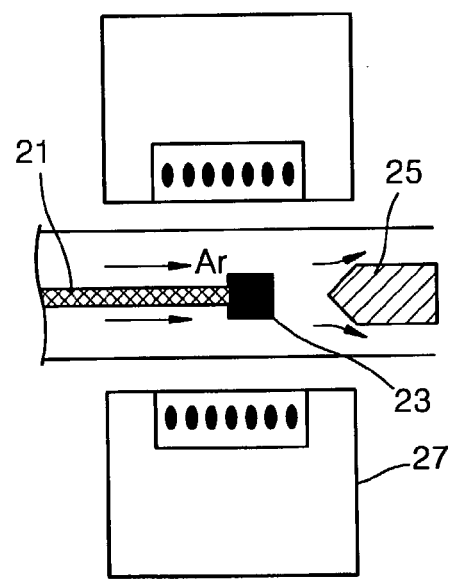
FIG. 2 shows a laser evaporation apparatus applied to a conventional laser vaporization method for manufacturing carbon nanotubes.
Figure 3:
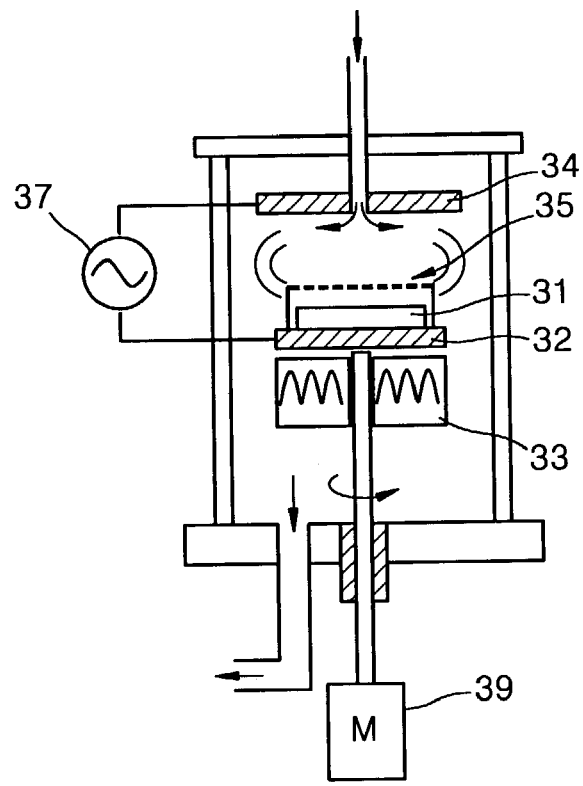
FIG. 3 shows an apparatus applied to a conventional plasma enhanced chemical vapor deposition (PECVD) method for manufacturing carbon nanotubes.
Figure 4:
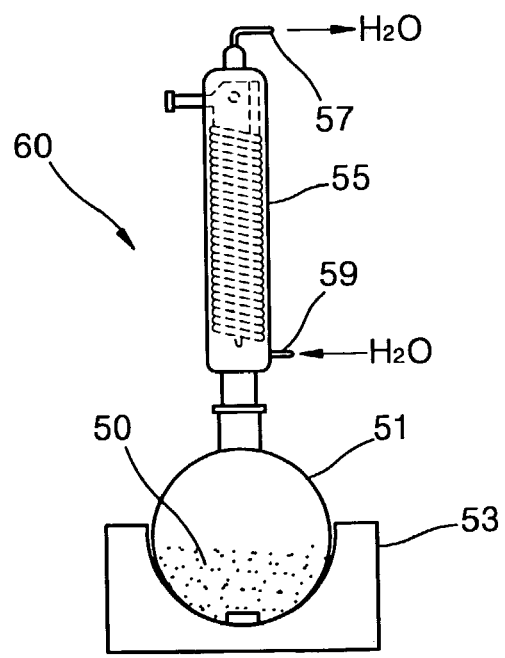
FIG. 4 shows an apparatus applied to a carbon nanotube manufacturing method according to an embodiment of the present invention.

FIG. 4 shows a reflux apparatus applied to a carbon nanotube manufacturing method according to an embodiment of the present invention. Referring to FIG. 4, to manufacture carbon nanotubes using the reflux apparatus 60, a round-bottomed flask 51 is charged with a dispersion of carbon nanoparticles in a strong acid solution 60 and heated by a heater 53. As the result of the heating, the strong acid solvent is vaporized, rises upward through a condenser 55, is liquefied by cooling water supplied along the inner wall of the condenser 55, and falls into the round-bottomed flask 51. As the strong acid solvent is repeated vaporized and liquefied while alternately rising and falling along the condenser 55, the carbon nanoparticles in the round-bottomed flask 51 are dissociated and agglomerate together to form carbon nanotubes.

In the present invention, the terms "carbon nanoparticles" are used as a comprehensive meaning to include various kinds of carbon nanoparticles, for example, single-walled carbon nanoparticles and multiple-welled carbon nanoparticles (which are also called "carbon nanoonion"). The carbon nanoparticles are formed using the above-discribed arc discharging method or a laser heating method in an apparatus of FIG. 5

Preferably, the strong acid solution 50 includes a nitric acid, a sulfuric acid, or a phosphoric acid in a concentration of about 30%. Preferably, the carbon nanoparticles are dispersed to a concentration of about 1% in the strong acid solution 50. The strong acid breaks the bonding between carbon atoms of the carbon nanotubes.

The strong acid solution 50 containing the carbon nanotubes is heated under reflux to a temperature of about 110–140° C. for at least 5 hours, for example, in an oil bath. The strong acid solution 50 is repeatedly refluxed at an appropriate temperature, and the carbon nanoparticles dispersed therein are rearranged into carbon nanotubes through a chemical reaction with the strong acid solution 50.

Figure 5:
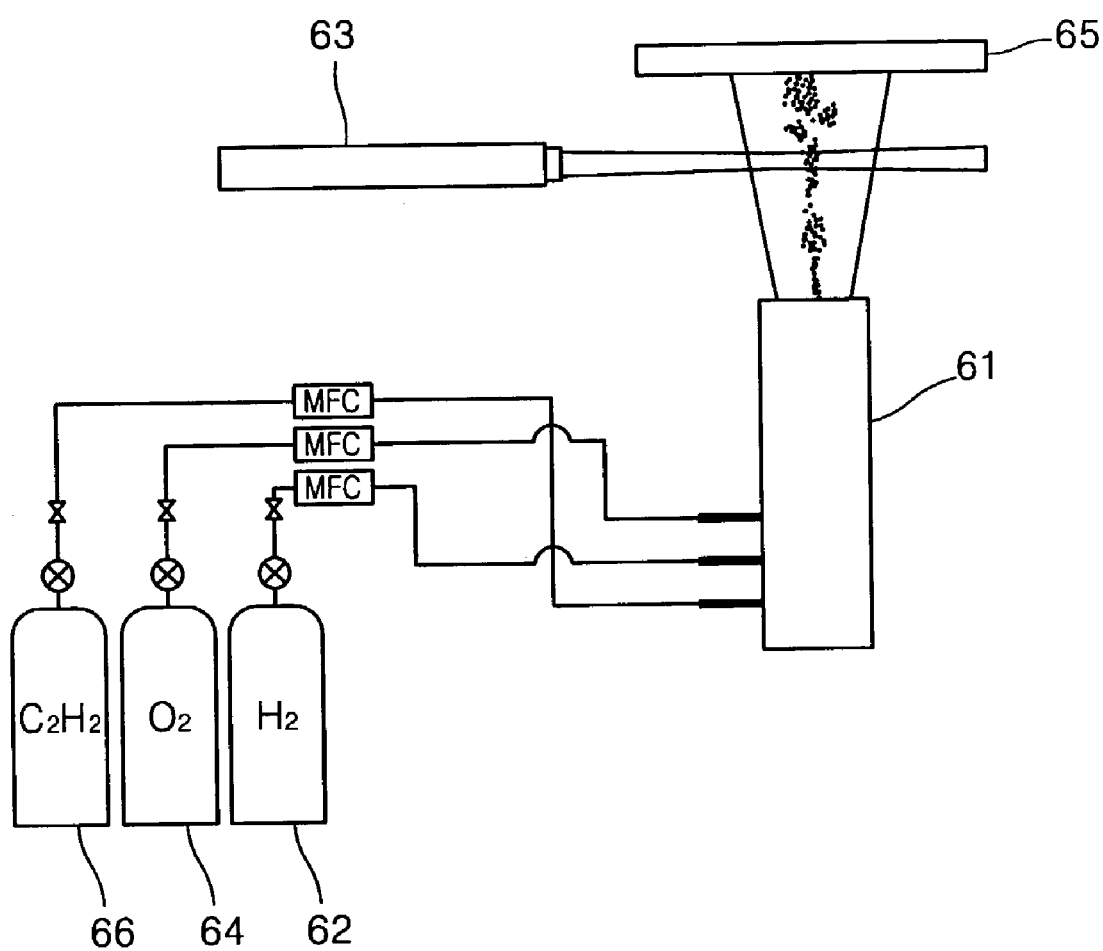
FIG. 5 shows an apparatus applied to a carbon nanotube manufacturing method according to another embodiment of the present invention in which carbon nanotubes are formed from carbon nanoparticles by laser heating.

FIG. 5 shows an apparatus applied to a carbon nanotube manufacturing method according to another embodiment of the present invention in which carbon nanotubes are formed from carbon nanoparticules by laser heating. The apparatus shown in FIG. 5 is constructed by incorporating an additional laser source into an apparatus for generating and growing carbon nanoparticles in a flame by flame hydrolysis deposition (FHD), so as to selectively sinter the carbon nanoparticles. The apparatus shown in FIG. 5 is based on the identical principles to the apparatus disclosed in Korean Laid-open Patent Publication No. 2001-51909.

Referring to FIG. 5, $O_2$ 62 and $H_2$ 64 supplied as fuels are combusted in a burner 61 to form a flame, whereas $C_2H_2$ 66 supplied as a carbon source into the burner 64 is combusted by the flame to produce carbon nanoparticles. A substrate 65 is disposed facing the flame from the burner 61 such that the carbon nanoparticles produced by the flame are adsorbed onto the substrate 65.

A high-power laser source 63 which emits a laser beam to heat and sinter the carbon narnotubes produced in the flame, is disposed between the substrate 65 and the burner 64. Preferably, the wavelength of the laser beam matches a major absorption band of the carbon nanotubes produced in the flame. $CH_4$, instead of $C_2H_2$, can be used as the carbon source. In the embodiment, a $CO_2$ laser having a maximum power of about 2600W was used, but other laser sources can be applied.

As the carbon nanoparticles produced in the flame are irradiated by the laser beam, the temperature of the carbon nanoparticles rises to facilitate a chemical reaction and collision of the carbon nanoparticles. As a result, the individual carbon nanoparticles agglomerate or fuse to form a cluster of carbon nanoparticles.

Compared with the arc discharging technique, the laser heating technique can control the size of carbon nanoparticles. In addition, since the carbon nanotubes can be produced at room temperature and atmospheric pressure, the laser heating technique is appropriate to produce carbon nanotubes on a mass scale at low costs.

In the carbon nanotube manufacturing method according to the present invention, the carbon nanoparticles produced by a conventional method, for example, laser vaporization or arc discharging, are used. As the carbon nanoparticles are disposed in the strong acid solution, the carbon nanotubes having weak bonds of carbon atoms are broken and agglomerate to be grown into carbon nanotubes.

Figure 6:
FIG. 6 is a transmission electron microscopic (TEM) photograph of carbon nanoparticles used in the carbon nanotube manufacturing method according to the present invention.
Figure 7:
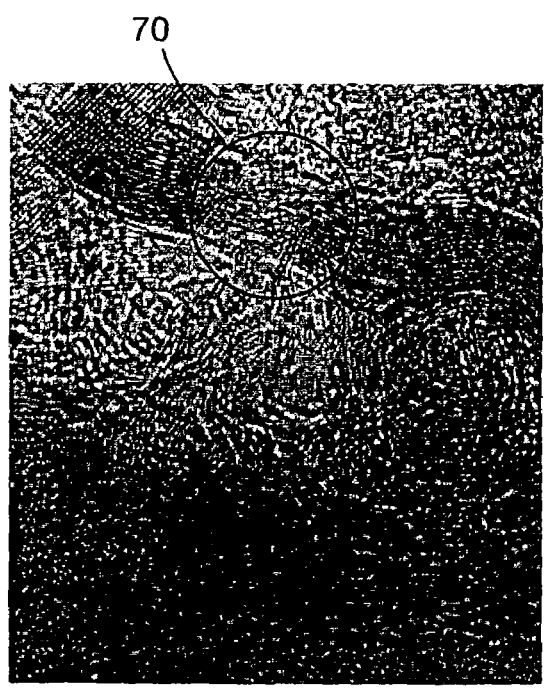
FIG. 7 is a TEM photograph of carbon nanotubes produced by the carbon nanotube manufacturing method according to an embodiment of the present invention.

FIG. 6 is a transmission electron microscopic (TEM) photograph of carbon nanoparticles before being applied to form carbon nanotubes, and FIG. 7 is a TEM photograph of the carbon nanotubes 70 produced from the carbon nanoparticles by the carbon nanotube manufacturing method according to an embodiment of the present invention. In FIG. 7, rod-like carbon nanotubes 70, which are not shown in FIG. 6, are apparent.

According to the present invention, carbon nanotubes can be simply formed on a large scale at low costs, through a chemical reaction between carbon nanoparticles and a strong acid solution. The new carbon nanotube manufacturing method is distinguished from conventional methods.

While the present invention has been particularly described in the above with reference to embodiments thereof, the above embodiments of the present invention are for illustrative purposes and are not intended to limit the scope of the invention.

For example, it will be understood by those skilled in the art that any material with electrophilicity, chemical and thermal stabilities, and instead of the strong acid solution, other chemical substances capable of breaking the bonding of carbon nanoparticles can be used, without departing from the spirit and scope of the invention as defined by the appended claims.

As described above, in the carbon nanotube manufacturing method according to the present invention, carbon nanoparticles formed by a conventional method are dispersed in a strong acid solution and fluxed to form the carbon nanotubes. Advantageously, the overall process is simple and can be applied to mass-scale production at low costs.

What is claimed is:

1. A method for manufacturing carbon nanotubes, comprising:
    dispersing carbon nanoparticles in a form other than a carbon nanotube in a strong acid solution; and
    heating said strong acid solution at a predetermined temperature wherein said strong acid solution vaporizes and is returned under reflux with the dissociation of carbon atom bonds within said dispersed carbon nanoparticles and the agglomeration thereof to form and grow carbon nanotubes from said dispersed carbon nanoparticles.

2. The method of claim 1 wherein said carbon nanoparticles in the form other than a carbon nanotube are formed by laser vaporization or arc discharging.

3. The method of claim 2, wherein said strong acid solution is selected from the group consisting of a nitric acid solution, a sulfuric acid solution, and a phosphoric acid solution.

4. The method of claim 2, wherein said strong acid solution has a concentration of about 30%.

5. The method of claim 1, wherein said carbon nanoparticles in the form other than a carbon nanotube and in a concentration of about 1% are dispersed in a nitric acid solution.

6. The method of claim 1, wherein said predetermined temperature at which said strong acid solution is heated is about 110–140° C.

* * * * *